US009471921B1

(12) United States Patent
Dalit et al.

(10) Patent No.: US 9,471,921 B1
(45) Date of Patent: *Oct. 18, 2016

(54) SECURE MOBILE PAYMENT AUTHORIZATION

(71) Applicants: Christian G. Dalit, Palo Alto, CA (US); Colin J. Roper, San Francisco, CA (US)

(72) Inventors: Christian G. Dalit, Palo Alto, CA (US); Colin J. Roper, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 13/907,772

(22) Filed: May 31, 2013

Related U.S. Application Data

(63) Continuation of application No. 13/248,984, filed on Sep. 29, 2011, now Pat. No. 8,577,810.

(51) Int. Cl.
| G06Q 10/00 | (2012.01) |
| G06Q 20/00 | (2012.01) |
| G06F 21/00 | (2013.01) |
| G06Q 20/40 | (2012.01) |
| G06Q 20/32 | (2012.01) |
| G06Q 20/22 | (2012.01) |

(52) U.S. Cl.
CPC .......... *G06Q 20/4016* (2013.01); *G06Q 20/22* (2013.01); *G06Q 20/3221* (2013.01); *G06Q 20/40145* (2013.01)

(58) Field of Classification Search
None
See application file for complete search history.

(56) References Cited

U.S. PATENT DOCUMENTS

| 7,865,448 | B2 | 1/2011 | Pizarro |
| 7,992,781 | B2* | 8/2011 | Hammad ............... 235/380 |
| 8,799,088 | B2* | 8/2014 | Rothschild ............. 705/18 |
| 2002/0147600 | A1 | 10/2002 | Waters et al. |
| 2008/0147481 | A1* | 6/2008 | Robinson et al. ....... 705/10 |
| 2009/0233579 | A1 | 9/2009 | Castell et al. |
| 2011/0230161 | A1* | 9/2011 | Newman ............. 455/404.1 |
| 2012/0166295 | A1 | 6/2012 | Loevenguth et al. |
| 2013/0006784 | A1 | 1/2013 | Krauss et al. |

\* cited by examiner

*Primary Examiner* — Allen Chein
(74) *Attorney, Agent, or Firm* — Osha Liang LLP

(57) ABSTRACT

A method to authorize a mobile payment for a transaction. The method includes receiving a facial image of a consumer who requests the mobile payment for the transaction using account information stored in a mobile device of the consumer, wherein the facial image is provided by a point-of-sale (POS) device while initiating the transaction on behalf of the consumer, receiving a verified facial image of an account holder, comparing the facial image of the consumer and the verified facial image of the account holder based on a pre-determined criterion to verify the consumer as the account holder, generating, in response to verifying the consumer as the account holder, an authorization of the mobile payment based on the account information, and sending the authorization to the POS device to complete the transaction.

15 Claims, 9 Drawing Sheets

SECURE MOBILE PAYMENT AUTHORIZATION

CROSS-REFERENCE TO RELATED APPLICATIONS

This is a continuation application and claims benefit under 35 U.S.C. §120 of U.S. patent application Ser. No. 13/248,984, entitled "SECURE MOBILE PAYMENT AUTHORIZATION," and filed on Sep. 29, 2011, the disclosure of which is hereby incorporated by reference.

BACKGROUND

Credit card fraud is a prevalent problem for consumers, merchants and credit card issuers/processors throughout the world. When a credit card or other types of charge card is stolen, or otherwise falsified, most card issuers will refund some or all of the charges applied to the card holders for purchases they did not make. Such a refund may be at the expense of the merchant, especially if the merchant did not verify a physical photo identification of the purchaser when the purchase was made. Verifying a physical photo identification at the point-of-sale (POS) requires a merchant's employee to manually study the facial features of the purchaser in front of him/her to compare to those of the person photographed in the physical photo identification. Even with the implementation of such measures, credit card fraud continues to be a problem.

Near Field Communication (NFC) is a set of short-range wireless technologies, typically requiring a short distance (e.g., 4 cm or less) for communicating between NFC devices. Instead of using a credit card, an NFC device may be used to make a payment in physical point of sale locations. A consumer may initiate the payment by holding a special mobile phone (e.g., equipped with a smartcard and an NFC module) near an NFC reader installed in a POS terminal, such as a checkout counter or a vending machine AN NFC based transaction may or may not require authentication before the transaction is completed. The payment may then be deducted from a pre-paid account or charged to a credit card account directly where such account is identified based on account information stored on the mobile phone (e.g., in the built-in smart card). As NFC payment technology becomes a more prevalent payment method, credit card fraud expands to include theft and falsification of NFC capable mobile phones as another means of identity theft.

SUMMARY

In general, in one aspect, the invention relates to a method to authorize a mobile payment for a transaction. The method includes receiving a facial image of a consumer, wherein the consumer requests the mobile payment for the transaction using account information of an account at a financial institution, wherein the account information is stored in a mobile device of the consumer, and wherein the facial image is provided by a point-of-sale (POS) device while initiating the transaction on behalf of the consumer, receiving a verified facial image of an account holder of the account from the financial institution, comparing the facial image of the consumer and the verified facial image of the account holder based on a pre-determined criterion to verify the consumer as the account holder, generating, in response to verifying the consumer as the account holder, an authorization of the mobile payment based on the account information, and sending the authorization to the POS device, wherein the POS device completes the transaction based on the authorization.

In general, in one aspect, the invention relates to a system to authorize a mobile payment for a transaction. The system includes a mobile device of a consumer requesting the mobile payment, the mobile device configured to send a signal to a point-of-sale (POS) device indicating that the mobile device supports the mobile payment, capture, in response to receiving a facial image request from the POS device, a facial image of the consumer, and send the facial image and account information of an account at a financial institution to the POS device, wherein the account information is stored in the mobile device, a verification server configured to receive the facial image provided by the POS device, receive a verified facial image of an account holder of the account from a server of the financial institution, compare the facial image of the consumer and the verified facial image of the account holder based on a pre-determined criterion to verify the consumer as the account holder, generate, in response to verifying the consumer as the account holder, an authorization of the mobile payment based on the account information, and send the authorization to the POS device, and the POS device configured to complete the transaction based on the authorization.

In general, in one aspect, the invention relates to a non-transitory computer readable medium storing instructions to authorize a mobile payment for a transaction. The instructions when executed by a computer comprising functionality to receive a facial image of a consumer, wherein the consumer requests the mobile payment for the transaction using account information of an account at a financial institution, wherein the account information is stored in a mobile device of the consumer, wherein the facial image is provided by a point-of-sale (POS) device while initiating the transaction on behalf of the consumer, receive a verified facial image of an account holder of the account from the financial institution, compare the facial image of the consumer and the verified facial image of the account holder based on a pre-determined criterion to verify the consumer as the account holder, generate, in response to verifying the consumer as the account holder, an authorization of the mobile payment based on the account information, and send the authorization to the POS device, wherein the POS device completes the transaction based on the authorization.

Other aspects of the invention will be apparent from the following detailed description and the appended claims.

DETAILED DESCRIPTION

Figure 1:
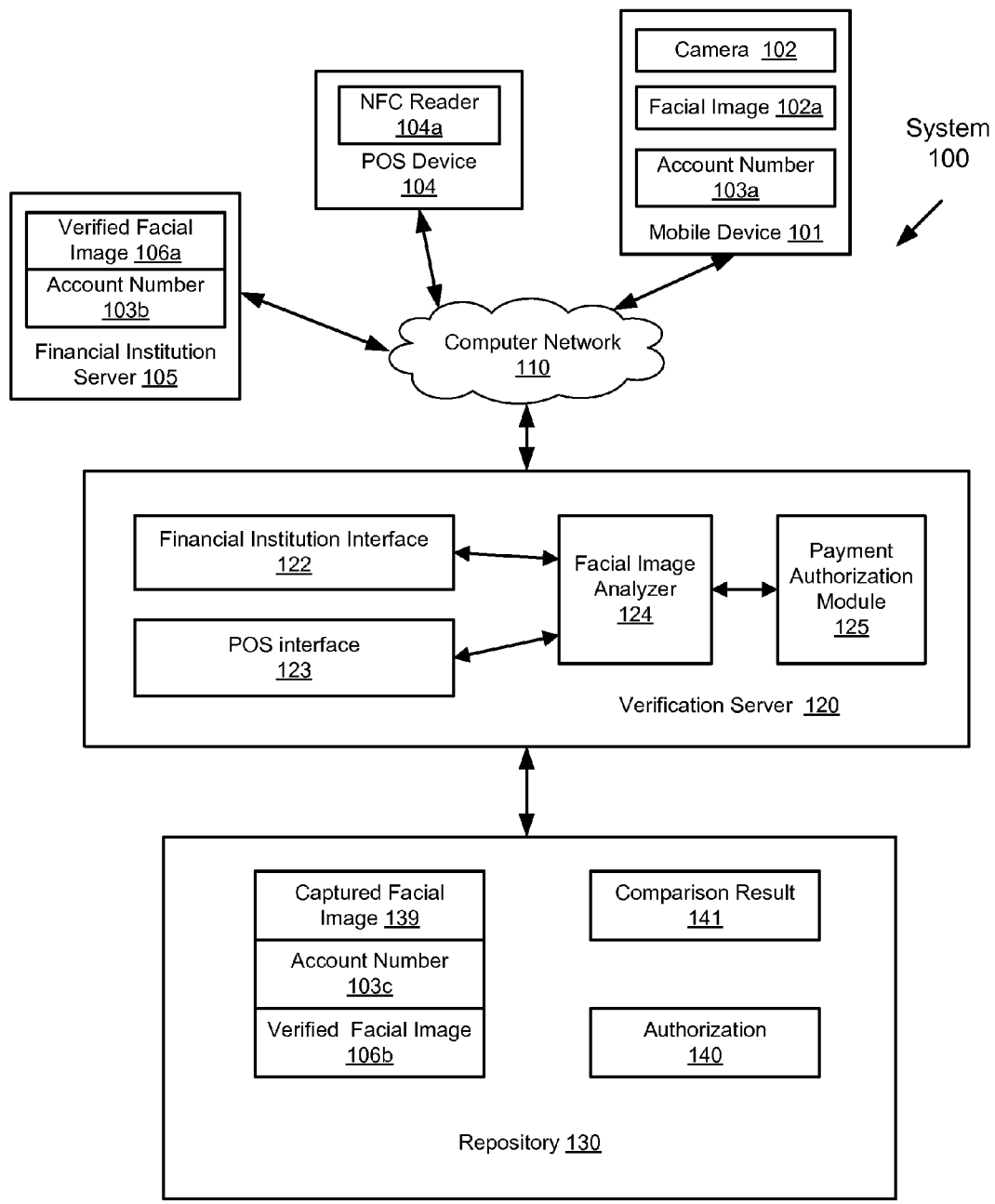
FIG. 1 shows a schematic diagram of a system of secured mobile payment authorization in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention use a front-facing camera on an NFC mobile payment device (e.g., an NFC capable mobile smartphone) along with facial recognition technology to verify a consumer's identity prior to the authorization of a mobile payment at an NFC equipped point-of-sale (POS). Specifically, upon signing up for a mobile payment authorization service, a consumer provides a self-portrait photo to establish the initial consumer profile for the mobile payment authorization service. Such self-portrait photo (referred to as a verified facial image) will be compared to an image captured at POS to verify identity of the consumer. Alternatively, the mobile payment authorization service may leverage existing State and Federal identification photo databases, such as those established for driver's licenses or passports.

In one or more embodiments, the mobile payment authorization service may be integrated within the mobile payment system, via a partnership/licensing arrangement with credit card processors or other mobile payment facilitators (potentially Google® (a registered trademark of Google Inc., Mountain View, Calif.), Apple® (a registered trademark of Apple Inc., Cupertino, Calif.), Paypal® (a registered trademark of PayPal, Inc., San Jose, Calif.), etc.). Functionalities of the mobile payment authorization service, compatible with the mobile payment system, may be included in the built-in software of an NFC mobile payment device or downloaded by the consumer.

In one or more embodiments, when a payment request is submitted to the mobile payment authorization service, the present invention immediately enables the front-facing camera on the consumer's mobile device and prompts the user to take a picture of him/herself. Upon snapping the photo and submitting it for approval, the image and payment details (e.g., credit card information or other account information stored in the mobile payment device) flow through the present invention's facial recognition/verification system where the facial features within the recently snapped picture are compared to that of the original, comparable image held within the consumer profile database. Upon verification of the identity of the consumer within the picture, this positive information is communicated to the credit card processor or other mobile payment facilitators who then authorize the payment. In contrast, if the facial recognition result indicates that the person within the photo is not that of the actual owner of the credit card or the mobile payment device, the image could automatically be sent to a database of potential fraudsters and automatically reported to law enforcement along with the GPS coordinates of the POS.

This security feature could significantly limit the number of credit card fraud cases handled by credit card issuers/processors, thus lowering credit card processing fees for merchants, reducing identity theft issues amongst consumers, and reducing risk assumed by merchant services providers.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes a point of sale (POS) device (104) equipped with a near field communication (NFC) reader (104a), a mobile device (101) of a consumer (not shown), a financial institution server (105), and a verification server (120). These various components of the system (100) are coupled via computer network (110). For example, the computer network (110) may include wired and/or wireless portions of the Internet and/or other data communications networks such as wide area networks (WANs), local area networks (LANs), etc. In addition, the mobile device (101) is equipped with a front facing camera (102) suitable for taking a self-portrait and is used by the consumer for mobile payment based on stored account information (e.g., account number (103a), expiration date, etc.). The financial institution server (105) is associated with an issuing institution (e.g., a bank) of the credit card, of which the account information is stored in the mobile device (101) and used by the consumer for mobile payment. In particular, the financial institution server (105) stores account information (e.g., account number (103b)) and corresponding verified facial images (e.g., verified facial image (106a)) of the account holders. Further, the verification server (120) is configured to execute payment authorization module (125), facial image analyzer (124), POS interface (123), and financial institution interface (122). In particular, the payment authorization module (125), facial image analyzer (124), POS interface (123), and financial institution interface (122) may be software applications installed onto the computer system (120).

The system (100) includes repository (130) operatively coupled to the verification server (120). The repository (130) may be used for storing account numbers (e.g., account number (103c)) to be verified, associated facial images (e.g., captured facial image (139), verified facial image (106b), etc.) used to verify the account numbers, comparison results (e.g., comparison result (141)) of the facial images, and authorizations (e.g., authorization (140)) for sending to the POS devices (e.g., POS device (104)). The repository (130) (and/or any of the data items stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The repository (130) may be a device internal to the verification server (120). Alternatively, the repository (130) may be an external storage device operatively connected to the verification server (120).

In one or more embodiments, the system (100) includes the POS device (104) that is configured to complete a sales transaction based on payment authorization. For example, the POS device (104) may be a retail check out machine operated by a store staff member or a standalone vending machine. In one or more embodiments, the POS device (104) is equipped with an NFC reader (104a) for receiving payment account information from a consumer's mobile device (101). For example, the payment account information may include account number and other pertinent information of a credit card or debit card issued by the financial institution of the financial institution server (105). In another example, the payment account may be an electronic wallet configured in the mobile device (101) and periodically refilled from the financial institution of the financial institution server (105) issuing the electronic wallet to the consumer. Such payment based on payment account information (e.g., account number (103a)) stored in and submitted from a mobile device (e.g., mobile device (101)) is referred to as a mobile payment. The payment account information (e.g., credit card or debit card information) may then be submitted to the verification server (120), by the POS device (104) directly or via the financial institution server (105), for authorization. Once authorized, the sales transaction is completed by debiting the credit card account or the debit card account stored on the financial institution server (105).

In one or more embodiments, the system (100) includes the mobile device (101) of a consumer (not shown) requesting the mobile payment. In particular, the mobile device (101) is configured to send a signal to the POS device (104) indicating that the mobile device (101) supports the mobile payment method. Specifically, the signal identifies the mobile payment authorization method as based on a facial image captured on the spot where the transaction takes place. Accordingly, the POS device (104) may send a facial image request signal back to the mobile device (101). In turn, the mobile device (101) is configured to capture, in response to the facial image request, a facial image (102a) of the consumer for sending along with payment account information to the POS device (104). For example, the facial image (102a) may be captured using a front facing camera (102) embedded in the mobile device (101). Further, the payment account information may include the account number (103a) that is stored in the mobile device (101) and selected by the consumer from a list of payment accounts (not shown) displayed by the mobile device (101) for selection.

In one or more embodiments, the mobile device (101) is configured with functionality to ensure that the facial image (102a) is captured within a short time window (i.e., one second, 3 seconds, 10 seconds, etc.) before combining with the consumer selected account number (103a) and sending to the POS device (104). In this manner, the mobile device (101) prevents anyone from using an old facial image acquired separately from the pending transaction to fraudulently seek payment authorization. For example, the mobile device (101) may require the consumer to complete the selection of the account number (103a) prior to activating the camera (102) for capturing the facial image (102a) such that the short time window can easily be met by the consumer's physical actions manipulating the mobile device (101). In another example, the mobile device (101) may allow the consumer to capture the facial image (102a) first, followed by alerts (e.g., beeping sound) indicating time remaining in the permissible time window before account number selection (e.g., of the account number (103a)) needs to be completed by the consumer. For example, the repetition rate, volume, or pitch of the beeping sound may vary as the remaining time window approaches zero.

In one or more embodiments, the system (100) includes the verification server (120) and the financial institution server (105) that are configured to receive the captured facial image (e.g., facial image (102a)) along with the payment account information (e.g., the account number (103a)) for verification. In one or more embodiments, the verification server (120) and the financial institution server (105) communicates via the financial institution interface (122). In one or more embodiments, the verification is based on account holders' verified facial images stored in a database on the financial institution server (105) where the payment accounts are maintained. For example, the verified facial image (106a) of an account holder (not shown) is linked to a particular account number (103b) stored on the financial institution server (105). Upon receiving the consumer selected account number (103a), the financial institution server (105) matches the account number (103a) to the account number (103b) to identify that the verified facial image (106a) belongs to a particular account holder whose account number (103b) matches the account number (103a) stored on and submitted from the mobile device (101).

Accordingly, the verification task is now reduced to matching the verified facial image (106a) (i.e., of the rightful account holder for account number (103b)) to the captured facial image (102a) of the physical holder of the mobile device (101), who is in possession of the account number (103a). In one or more embodiments, the verification server (120) is in communication with the financial institution server (105) and is configured to compare, using the facial image analyzer (124), the facial image (102a) of the consumer and the verified facial image (106a) of the account holder based on a pre-determined criterion to verify the consumer as the account holder. Once verified, the verification server (120) generates, using the payment authorization module (125), an authorization of the mobile payment based on the account information (i.e., account number (103a)). In particular, the authorization is sent to the POS device (104) where the mobile payment is completed.

In one or more embodiments, the authorization of the mobile payment is further based on additional criteria, such as account balance, credit rating, and other pre-determined authorization policies. In one or more embodiments, the payment authorization module (125) is dedicated to authorization based solely on facial image verification and works in conjunction with other payment authorization modules (not shown) that are based on additional and separate authorization criteria to generate the overall authorization of the mobile payment. In one or more embodiments, the payment authorization module (125) is integrated with these other payment authorization modules while the verification server (120) is operated by a mobile payment processor, such as a credit card processor (not shown). In one or more embodiments, the verification server (120) is operated by a third party verification provider separate from the credit card processor (not shown). In such embodiments, the payment authorization module (125) may assign a confidence measure (e.g., 100%, 70%, etc.) to the facial image verification such that the credit card processor can generate the overall mobile payment authorization based on the confidence measure as well as other pre-determined authorization criteria.

In one or more embodiments, the facial image (102a) and account number (103a) are received directly by the verification server (120) from the POS device (104) via the POS interface (123) in a verification request. In such embodiments, the verification server (120) in turn requests, in response to receiving the account number (103a) and based on the account number (103a), the verified facial image (106a) from the financial institution server (105) based on matching the account number (103a) to the account number (103b).

In one or more embodiments, the facial image (102a) and account number (103a) are sent (e.g., via a credit card payment processing network) to the financial institution server (105) first before being routed to the verification server (120) in a verification request. In one such embodiment, the financial institution server (105) may retrieve, prior to contacting the verification server (120), the verified facial image (106a) based on matching the account number (103a) to the account number (103b). In this scenario, the verified facial image (106a) may be sent with the facial image (102a) and account number (103a) together to the verification server (120) without any explicit request from the verification server (120). In another such embodiment, the financial institution server (105) may send the facial image (102a) and account number (103a) to the verification server (120) first and waiting for explicit request from the verification server (120) before retrieving and providing the verified facial image (106a).

Figure 2A:
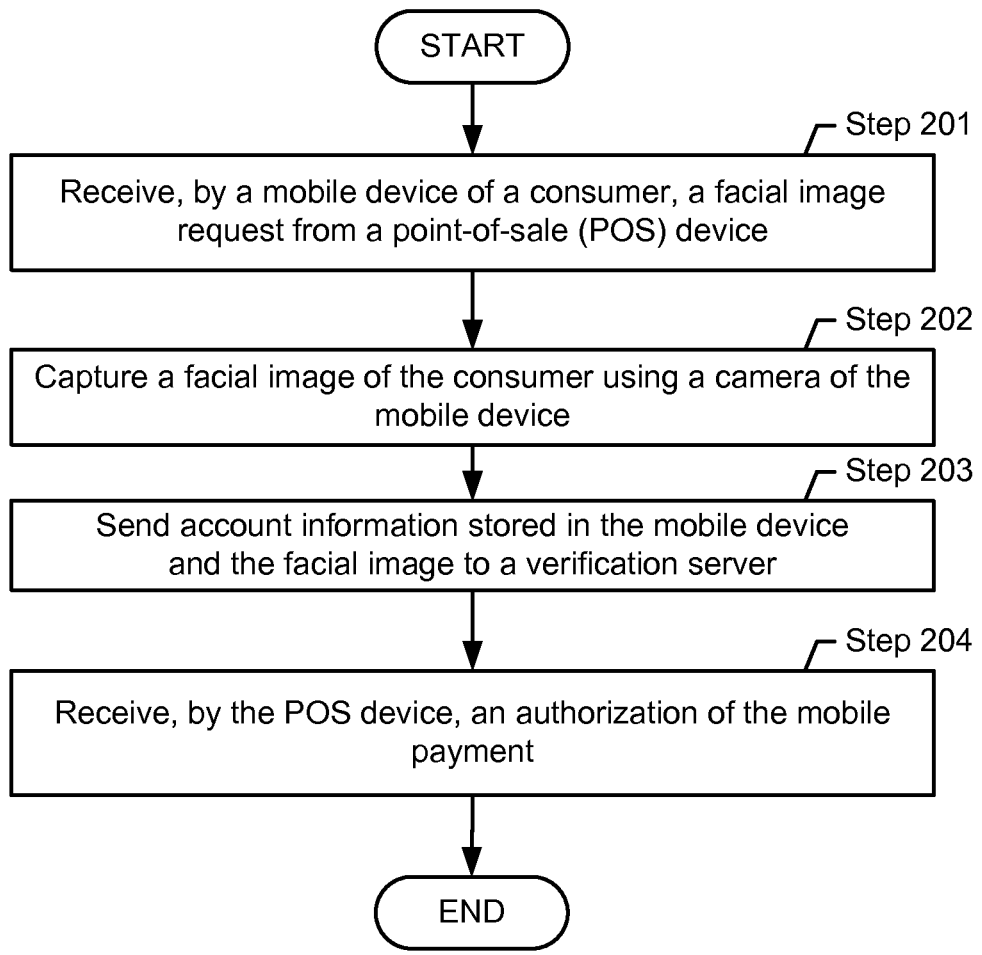
FIGS. 2A and 2B show a flowchart of a method of secured mobile payment authorization in accordance in accordance with one or more embodiments of the invention.
Figure 2B:
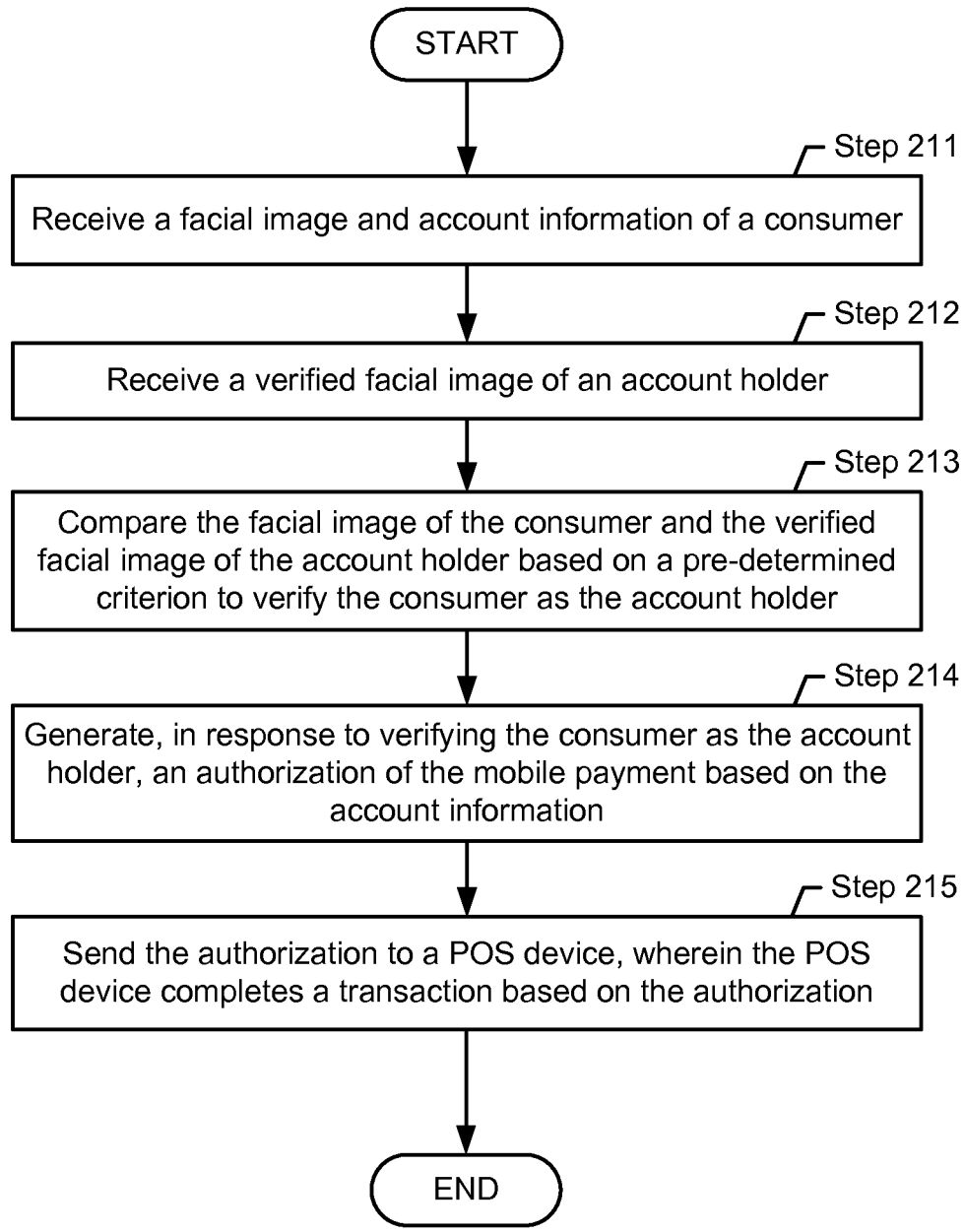

FIGS. 2A and 2B depict a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments, the method described in reference to FIGS. 2A and 2B may be practiced using the system (100) described in reference to FIG. 1 above. In particular, FIG. 2A depicts the method from the perspective of a consumer requesting authorization of a mobile payment while FIG. 2B depicts the method from the perspective of a verification server authorizing the mobile payment.

In one or more embodiments, functionalities described in reference to FIG. 2A below is provided in a mobile payment software module installed on a mobile device of a consumer. Initially in Step 201 of FIG. 2A, a facial image request from a point-of-sale (POS) device is received by the mobile device of the consumer. For example, the consumer has positioned the mobile device near the POS device to initiate a mobile payment for a transaction, thus triggering such facial image request. In one or more embodiments, the POS device is equipped with an NFC reader receiving a signal from the mobile device identifying that the mobile device supports the facial image based mobile payment.

In Step 202, the mobile device captures, in response to receiving the facial image request, a facial image of the consumer using a camera of the mobile device. For example, a message may be displayed on the mobile device upon receiving the facial image request, prompting the consumer to activate a built-in camera on the mobile device. In one or more embodiments, the mobile device is configured with the functionality to prevent any other facial image (e.g., captured prior to, or unrelated with, the pending facial image request) to be used for authorizing the pending mobile payment in a fraudulent manner. For example, the activation button to use the built-in camera for capturing the facial image may be controlled by the mobile payment software module and is separate from the built-in camera button for general picture taking.

In Step 203, account information stored in the mobile device is sent along with the facial image to a verification server to verify the identity of the consumer for authorizing the mobile payment. In one or more embodiments, the account information is selected by the consumer from a list of available payment accounts that are displayed on the mobile device for selection. For example, the list of payment accounts may be displayed in response to the mobile device detecting the POS device in its proximity or in response to receiving the facial image request. In another example, the list of payment accounts may be displayed in response to capturing the facial image as activated by the consumer using the special activation button provided by mobile payment software. In one or more embodiments, the payment account may include a credit card account, a debit card account, or an electronic wallet.

In Step 204, an authorization of the mobile payment based on the account information is received by the POS device where the transaction is completed based on the authorization. In one or more embodiments, the account information and the facial image are sent to the verification server by the POS device. In turn, the verification server requests the verified facial image from the financial institution based on the account information. In one or more embodiments, the facial image and the account information are first sent to the financial institution by the POS device, for example via a credit card payment processing network. Subsequently, the facial image and the account information are routed to the verification server from the financial institution as a portion of the overall mobile payment authorization. In one such embodiment, the financial institution retrieves a verified facial image associated with the account information from a database and sends the verified facial image along with the other information (i.e., the facial image and the account information originated from the mobile device) together to the verification server. In another such embodiment, the financial institution waits for the verification to send a request before retrieves the verified facial image for sending to the verification server.

Additional details of generating the mobile payment authorization are described in reference to FIG. 2B. As noted above, FIG. 2B depicts the method from the perspective of a verification server authorizing the mobile payment.

Initially in Step 211, a facial image of a consumer is received by a verification server. As discussed above, the facial image is provided by a point-of-sale (POS) device while initiating a transaction on behalf of a consumer. Specifically, the POS device sends a facial image request to an NFC capable mobile device of the consumer that captures the facial image on spot where the transaction takes place.

In Step 212, a verified facial image of an account holder is received by the verification server. As discussed above, in one or more embodiments, the aforementioned facial image is received with payment account information directly by the verification server (e.g., as part of a credit card payment processing network) from the POS device. In such embodiments, the verification server in turn requests the verified facial image of the account holder from a financial institution identified based on the account information.

In other embodiments, the facial image and the account information are first sent to the financial institution (e.g., routed through a credit card payment processing network) by the POS device before being routed to the verification server along with the verified facial image linked to the account information.

In Step 213, the facial image of the consumer and the verified facial image of the account holder are compared based on a pre-determined criterion to verify the consumer as the account holder. In one or more embodiments, the facial image verification is assigned a confidence measure (e.g., 100%, 70%, etc.) representing estimated accuracy or reliability of such comparison. For example, the confidence measure may be based on quality of the images and/or limitation of image comparison techniques used.

In Step 214, in response to verifying the consumer as the account holder, an authorization of the mobile payment based on the account information is generated. As discussed above, the authorization of the mobile payment may be based on an aggregated evaluation of the facial image verification with assigned confidence level as well as other pre-determined authorization criteria, such as account balance, consumer credit rating, etc. In one or more embodiments, the authorization is generated by a mobile payment processor (e.g., a credit card payment processor) equipped with the facial image verification capability. In one or more embodiments, the authorization is generated by a mobile payment processor (e.g., a credit card payment processor) using a third party verification provider that is equipped with the facial image verification capability.

In Step 215, the authorization of mobile payment is sent to the POS device, where the transaction is completed based on the authorization. For example, the transaction may be completed by deducting an authorized amount from a credit card, debit card, electronic wallet, etc. identified based on the account information.

FIGS. 3A-3E show an application example in accordance with one or more embodiments of the invention. This example application may be practiced using the system (100) of FIG. 1 and based on the method described with respect to FIG. 2 above.

Figure 3A:
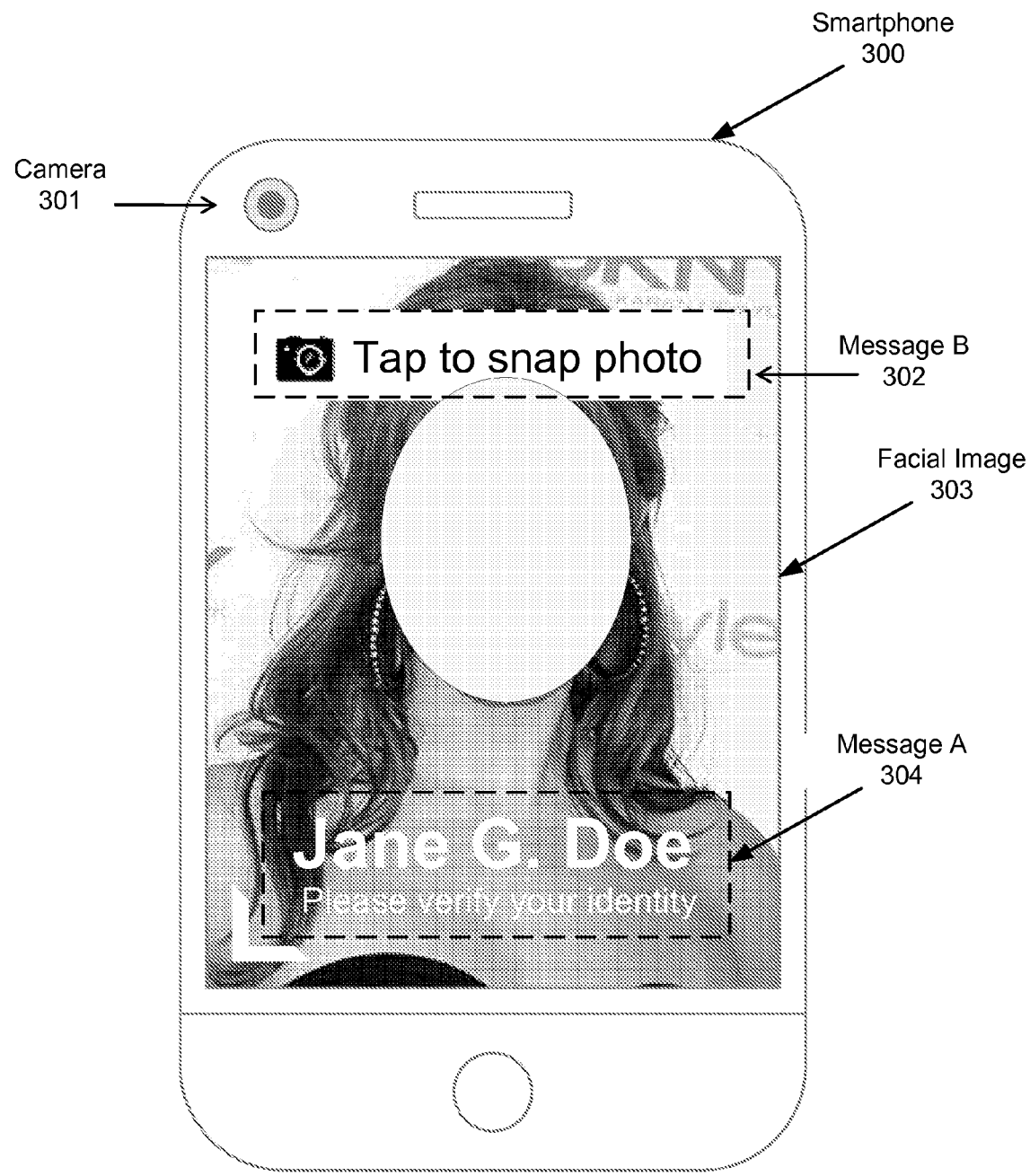
FIGS. 3A-3E show an example of secured authorization for mobile payment in accordance in accordance with one or more embodiments of the invention.
Figure 3B:
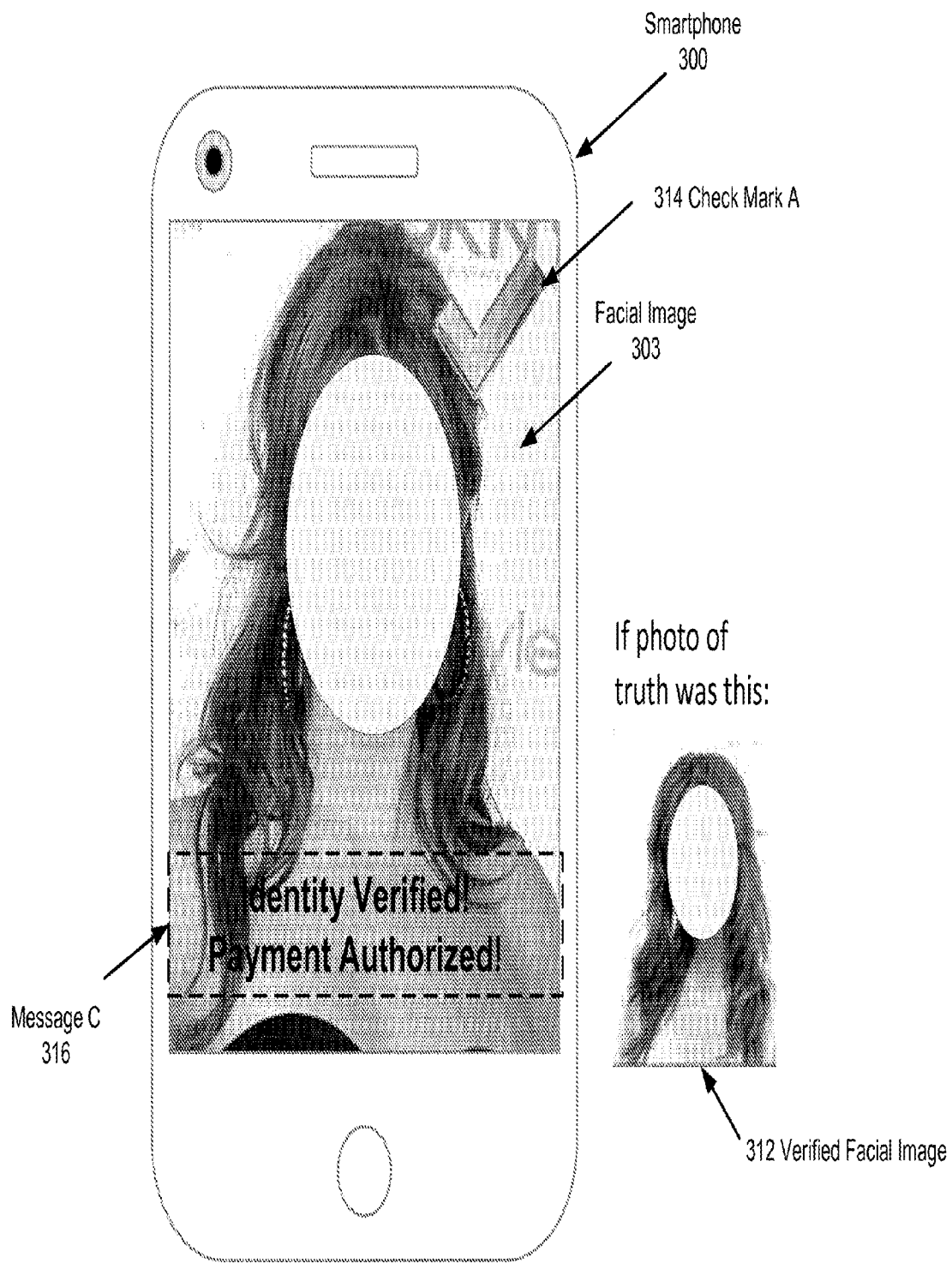

The example depicted in FIGS. 3A-3D is based on a Safe Mobile Wallet Application (SMWA), which is an example system for preventing fraudulent credit card activities. In this example, starting with FIG. 3A showing a smartphone (300) configured with the SMWA functionality, a consumer Emily is shopping at a retail store and goes to the register to pay for a $300 women's purse. The retail store's register is outfitted with an NFC reader that enables consumers to wave their mobile devices over it to initiate a mobile payment. The cashier rings Emily up. Emily opens a mobile wallet (i.e., a client application of the SMWA) installed on her smartphone (300) and selects her ABC credit card from a list. In response, Emily's smartphone (300) prompts her via message A (304) and message B (302) displayed on the smartphone (300) to capture a video image of her face via her front-facing camera (301) on her smartphone (300). As she holds the smartphone (300) pointing the camera (301) in place she sees it has captured her facial image (303). Upon confirmation through the SMWA system (as depicted in detail in FIGS. 3D and 3E below) based on a photo of truth, which is an SWMA system verified facial image (312) shown in FIG. 3B, she receives a success screen on the mobile device (300) and the NFC functionality of her phone is now ready to proceed with the mobile payment. As shown in FIG. 3B, the success screen includes the check mark A (314) and message C (316) overlaying Emily's facial image (303) on the smartphone (300).

Next, Emily waves her smartphone across the point of sale NFC reader and makes her transaction. The cashier sees that the authorization has gone through and hands over the purchased purse to Emily. Emily is a delighted customer because she is confident that no one will be able to fraudulently use her ABC credit card. The ABC credit card processor receives additional data in the transaction to indicate that SWMA's facial recognition technology was used to verify this purchase. With this data, the ABC credit card processor is more confident in the authenticity of this transaction than if the consumer had only signed a receipt. As such, the ABC credit card processor is able to take on less risk in this transaction and pass along much of its savings to its merchant customer, i.e., the retail store where Emily purchased her purse.

Figure 3C:
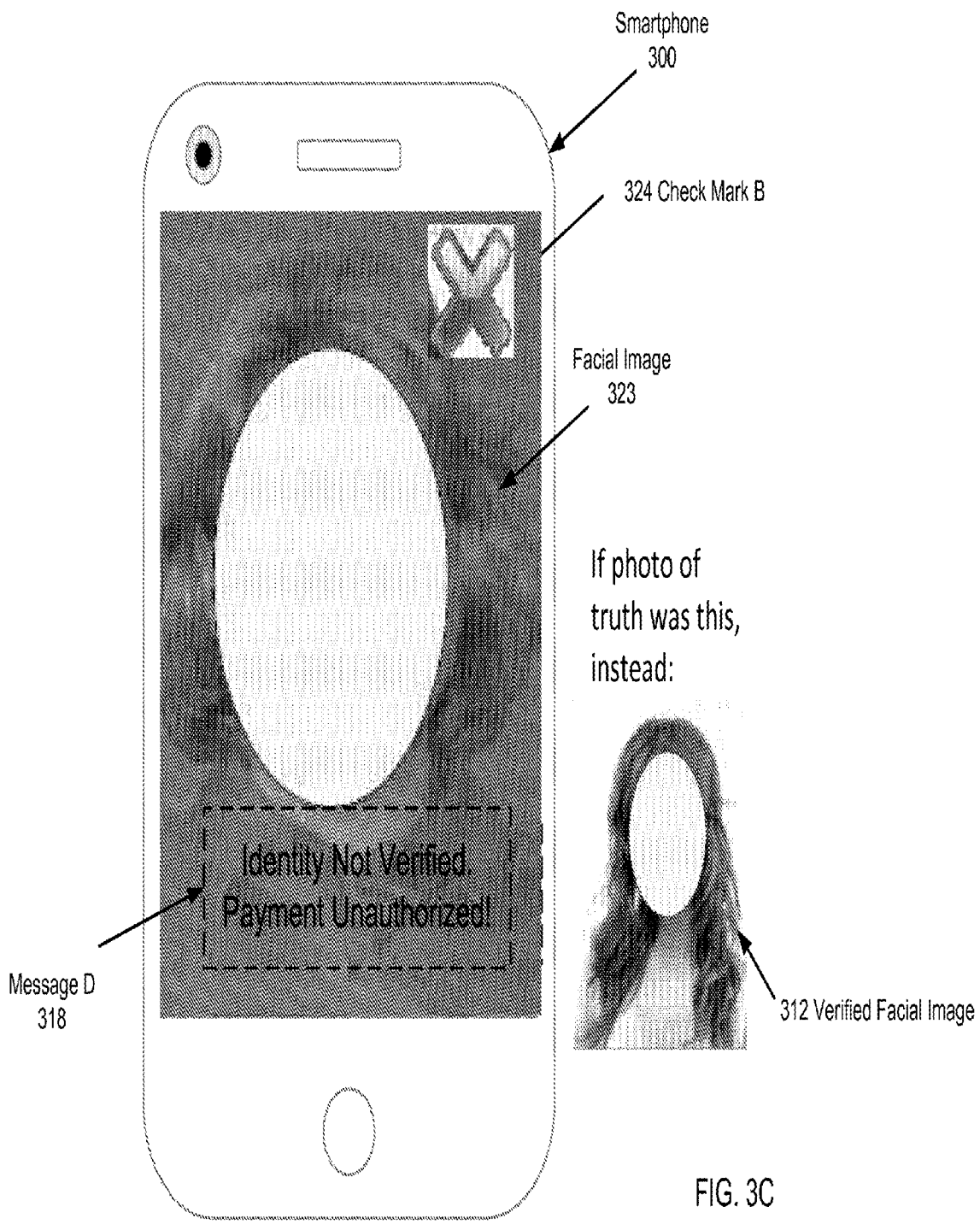
Figure 3D:
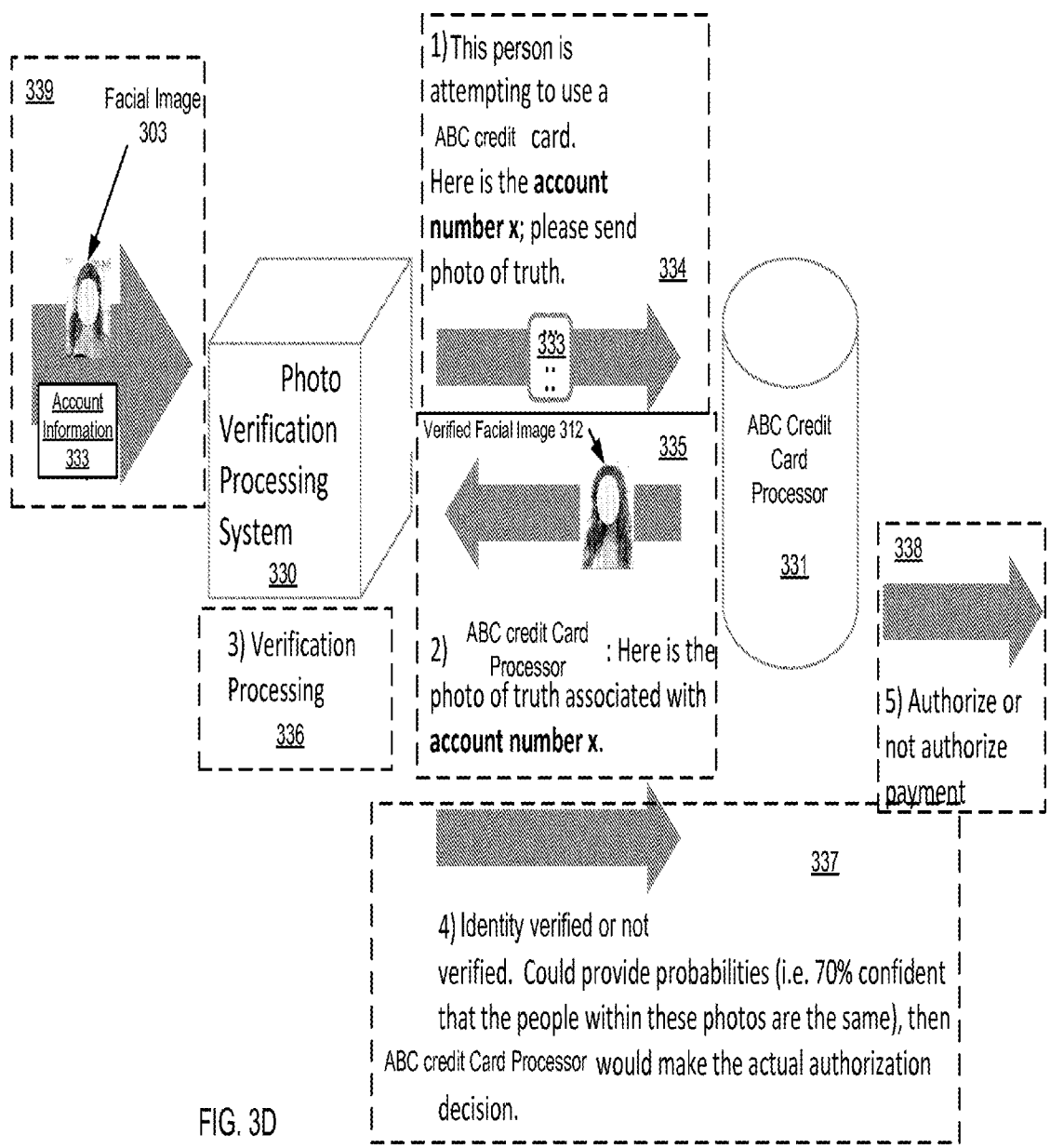

Later that day, a thief steals Emily's smartphone (300). As the thief opens Emily's mobile wallet and tries to transact, as shown in FIG. 3C, the facial image (323) of the thief's face is not recognized by the SWMA system based on the verified facial image (312) so the transaction is not able to process. Specifically, the smartphone (300) displays the rejection screen having the check mark B (324) and message D (318) overlaying the facial image (323).

As noted above, FIG. 3D shows scenario A of a confirmation process flow through the example SMWA system. Initially, Emily takes a picture of herself and waves the smartphone (300) over the NFC reader of the POS to initiate the mobile payment. Element (339) shows that both the account information (e.g., credit card number) (333) and the captured facial image (303) of Emily are transmitted to the photo verification processing system (330) of the SMWA system. Element (334) shows that the photo verification processing system (330) in turn sends the account information (333) to the ABC credit card processor (331) indicating a pending transaction at the POS. In response, Element (335) shows that the ABC credit card processor (331) looks up from a database the verified facial image (312) corresponding to the account information (333) and returns it to the photo verification processing system (330). Based on the verified facial image (312), a facial recognition image analysis is performed to compare the facial image (303) from the POS and the verified facial image (312) from the ABC credit card processor (331), as shown in Element (336). Accordingly, a determination is made in Element (337) as to whether the identity is verified or not by the SMWA system. For example, the identity verification may be assigned a confidence level (e.g., 70%) such that the ABC credit card processor (331) may make a final authorization decision on approving or rejecting the credit card transaction, as shown in Element (338) where the decision is sent to the POS.

Figure 3E:
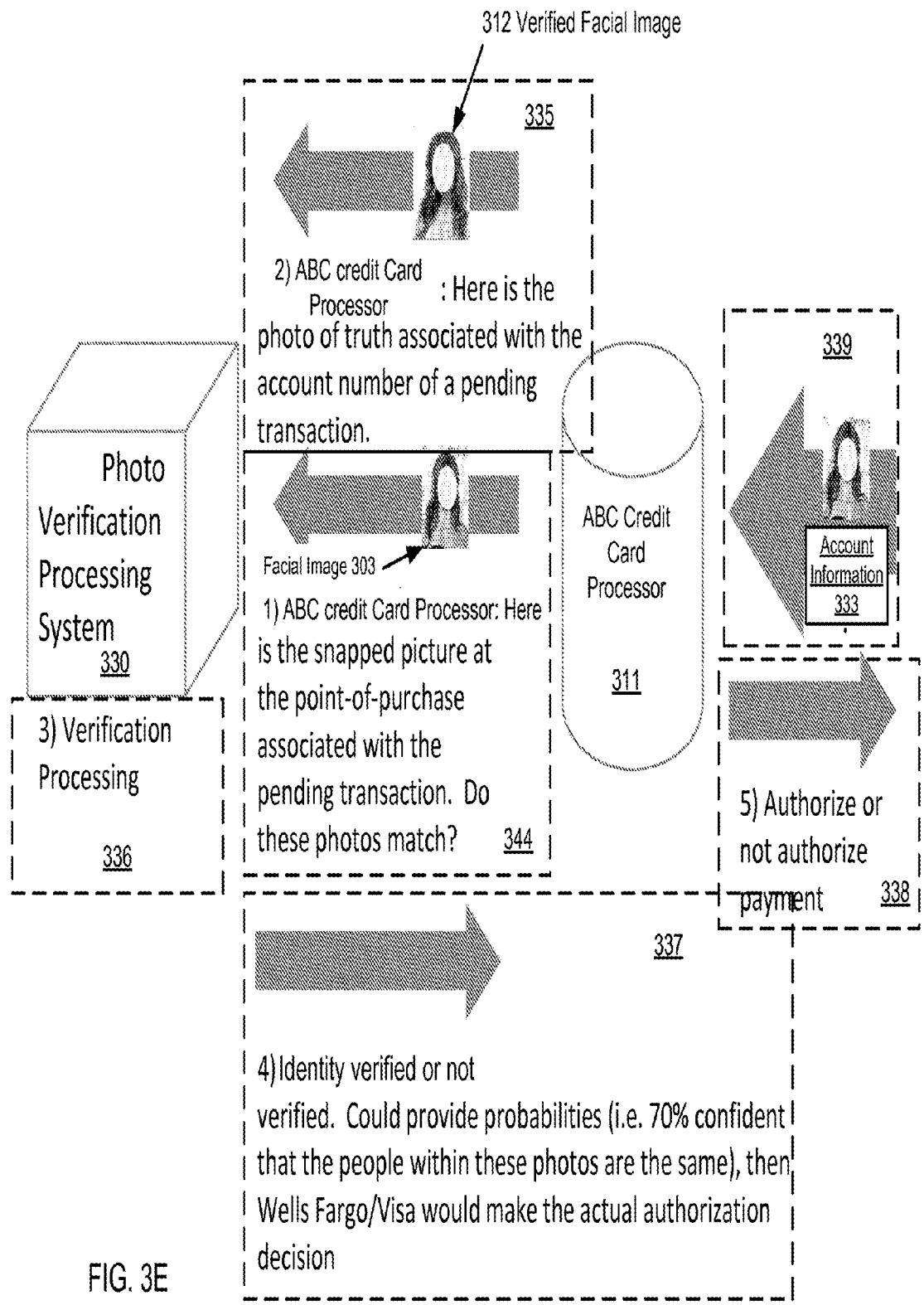

In contrast, FIG. 3E shows scenario B of a confirmation process flow through the example SMWA system. Initially, Emily takes a picture of herself and waves the smartphone (300) over the NFC reader of the POS to initiate the mobile payment. Element (339) shows that both the account information (e.g., credit card number) (333) and the captured facial image (303) of Emily are transmitted to the ABC credit card processor (311). In response, Element (335) shows that the ABC credit card processor (331) looks up from a database the verified facial image (312) corresponding to the account information (333) and transmits it to the photo verification processing system (330). At the same time, Element (344) shows that the ABC credit card processor (331) also sends the captured facial image (303) to the photo verification processing system (330). In Element (336), a facial recognition image analysis is performed to compare the facial image (303) from the POS and the verified facial image (312) from the database of the ABC credit card processor (331). Accordingly, a determination is made in Element (337) as to whether the identity is verified or not by the SMWA system. For example, the identity verification may be assigned a confidence level (e.g., 70%) such that the ABC credit card processor (331) may make a final authorization decision on approving or rejecting the credit card transaction, as shown in Element (338) where the decision is sent to the POS.

Figure 4:
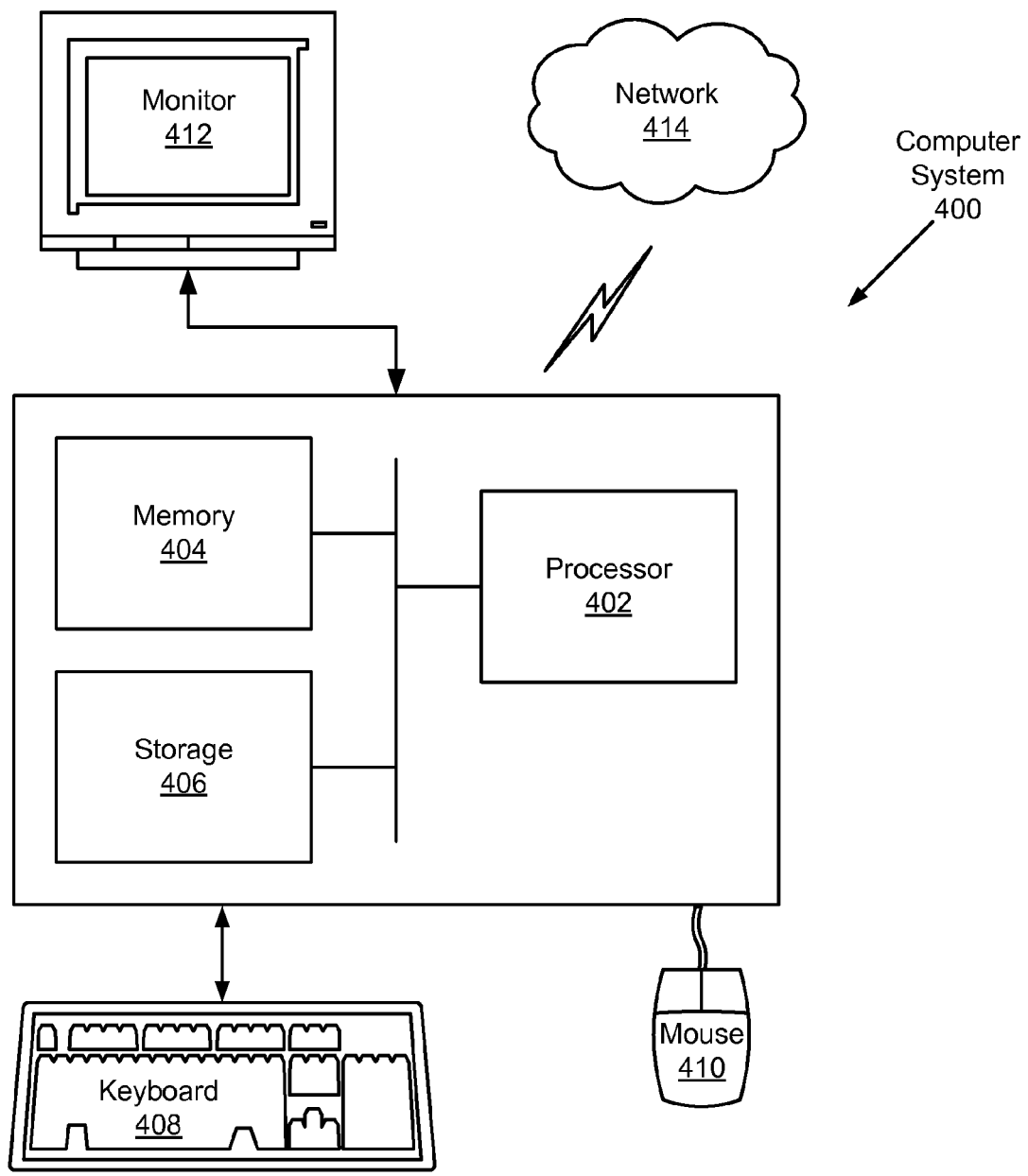
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to authorize a mobile payment for a transaction, comprising:
   receiving, from a financial institution, a facial image of a consumer and account information of an account at the financial institution, wherein the account information is linked with the facial image, and the facial image and the account information are first sent to the financial institution from a point-of-sale (POS) device,
   wherein the consumer requests the mobile payment for the transaction using the account information stored in a mobile device of the consumer, and
   wherein the facial image is captured using the mobile device by at least:
      receiving, by the mobile device, a facial image request from the POS device, wherein the facial image request is sent by the POS device in response to receiving a signal from the mobile device while initiating the transaction on behalf of the consumer, and
      displaying, by the mobile device in response to receiving the facial image request, a first message prompting the consumer to capture the facial image within a pre-determined time window using a camera of the mobile device;
   requesting, in response to receiving the account information and based on the account information, a verified facial image from the financial institution;
   receiving the verified facial image of an account holder of the account from the financial institution, wherein the account is identified at the financial institution based on the account information;
   comparing the facial image of the consumer and the verified facial image of the account holder based on a pre-determined criterion to verify the consumer as the account holder;
   generating, in response to verifying the consumer as the account holder, an authorization of the mobile payment based on the account information; and
   sending the authorization to the POS device,
   wherein the POS device completes the transaction based on the authorization,
   wherein the mobile device displays a second message informing the consumer regarding the authorization, and
   wherein the financial institution shares, with a merchant of the transaction, a saving due to reduced risk of the transaction based on verifying the consumer using the facial image.

2. The method of claim 1,
   wherein the POS device comprises near-field-communication functionality, and
   wherein the signal indicates that the mobile device is configured to support the mobile payment.

3. The method of claim 1,
   wherein the account is at least one selected from a group consisting of a credit card account and a debit card account, and
   wherein completing the transaction comprises debiting, at the financial institution, at least one selected from a group consisting of the credit card account and the debit card account.

4. The method of claim 1,
   wherein the account is associated with an electronic wallet stored in the mobile device,
   wherein completing the transaction comprises debiting the electronic wallet, and
   wherein the electronic wallet is refilled from the financial institution.

5. A method to authorize a mobile payment for a transaction, comprising:
   receiving, by a mobile device of a consumer, a facial image request from a point-of-sale (POS) device, wherein the facial image request is sent by the POS device in response to receiving a signal from the mobile device while initiating the transaction on behalf of the consumer;
   displaying, by the mobile device in response to receiving the facial image request, a first message prompting the consumer to capture a facial image of the consumer within a pre-determined time window using a camera of the mobile device;
   sending account information of an account at a financial institution and the facial image to a verification server, wherein the account information is stored in the mobile device,
      wherein the facial image and the account information are first sent to the financial institution by the POS device, and
      wherein the facial image and the account information are subsequently received by the verification server from the financial institution; and further displaying, by the mobile device in response to sending the account information and the facial image, a second message indicating an authorization of the mobile payment, wherein the verification server generates the authorization of the mobile payment based on the account information by:

requesting, in response to receiving the account information and based on the account information, a verified facial image from the financial institution;

receiving, based on the account information, the verified facial image of an account holder from a server of the financial institution;

comparing the facial image of the consumer and the verified facial image of the account holder based on a pre-determined criterion to verify the consumer as the account holder; and sending the authorization to the POS device, and wherein the POS device completes the transaction based on the authorization, wherein the financial institution shares, with a merchant of the transaction, a saving due to reduced risk of the transaction based on verifying the consumer using the facial image.

6. The method of claim 5, wherein the POS device comprises near-field-communication functionality, wherein the facial image is captured and sent to the POS device by the mobile device in response to receiving the facial image request from the POS device, and wherein the signal indicates that the mobile device is configured to support the mobile payment.

7. The method of claim 5, wherein the account is at least one selected from a group consisting of a credit card account and a debit card account, and wherein completing the transaction comprises debiting, at the financial institution, at least one selected from a group consisting of the credit card account and the debit card account.

8. The method of claim 5, wherein the account is associated with an electronic wallet stored in the mobile device, wherein completing the transaction comprises debiting the electronic wallet, and wherein the electronic wallet is refilled from the financial institution.

9. A system to authorize a mobile payment for a transaction, comprising:

a mobile device of a consumer requesting the mobile payment, the mobile device configured to:

send a signal to a point-of-sale (POS) device indicating that the mobile device supports the mobile payment;

display, in response to receiving a facial image request from the POS device, a first message prompting the consumer to capture a facial image of the consumer within a pre-determined time window;

send the facial image and account information of an account at a financial institution to the POS device, wherein the account information is stored in the mobile device; and further display, in response to sending the account information and the facial image, a second message indicating an authorization of the mobile payment, a verification server configured to:

receive, from the financial institution, the facial image and the account information linked with the facial image provided by the POS device;

request, in response to receiving the account information and based on the account information, a verified facial image from the financial institution;

receive the verified facial image of an account holder of the account from a server of the financial institution;

compare the facial image of the consumer and the verified facial image of the account holder based on a pre-determined criterion to verify the consumer as the account holder;

generate, in response to verifying the consumer as the account holder, an authorization of the mobile payment based on the account information; and send the authorization to the POS device; and the POS device configured to:

send the facial image and the account information to the financial institution; and complete the transaction based on the authorization, wherein the financial institution shares, with a merchant of the transaction, a saving due to reduced risk of the transaction based on verifying the consumer using the facial image.

10. The system of claim 9, wherein the account is at least one selected from a group consisting of a credit card account and a debit card account, and wherein completing the transaction comprises debiting, at the financial institution, at least one selected from a group consisting of the credit card account and the debit card account.

11. The system of claim 9, wherein the mobile device is further configured to store an electronic wallet associated with the account and refill the electronic wallet from the financial institution, and wherein completing the transaction comprises debiting the electronic wallet.

12. A non-transitory computer readable medium storing instructions to authorize a mobile payment for a transaction, the instructions when executed by a computer comprising functionality to:

receive, from a financial institution, a facial image of a consumer and account information of an account at the financial institution, wherein the account information is linked with the facial image, and the facial image and the account information are first sent to the financial institution from a point-of-sale (POS) device, wherein the consumer requests the mobile payment for the transaction using the account information stored in a mobile device of the consumer, and wherein the facial image is captured using the mobile device by at least:

receiving, by the mobile device, a facial image request from the POS device, wherein the facial image request is sent by the POS device in response to receiving a signal from the mobile device while initiating the transaction on behalf of the consumer; and displaying, by the mobile device in response to receiving the facial image request, a first message prompting the consumer to capture the facial image within a pre-determined time window using a camera of the mobile device;

request, in response to receiving the account information and based on the account information, a verified facial image from the financial institution;

receive the verified facial image of an account holder of the account from the financial institution, wherein the account is identified at the financial institution based on the account information;

compare the facial image of the consumer and the verified facial image of the account holder based on a predetermined criterion to verify the consumer as the account holder;

generate, in response to verifying the consumer as the account holder, an authorization of the mobile payment based on the account information; and send the authorization to the POS device, wherein the POS device completes the transaction based on the authorization, wherein the mobile device displays a second message informing the consumer regarding the authorization, and wherein the financial institution shares, with a merchant of the transaction, a saving due to reduced risk of the transaction based on verifying the consumer using the facial image.

13. The non-transitory computer readable medium of claim 12,
wherein the POS device comprises near-field-communication functionality, and
wherein the signal indicates that the mobile device is configured to support the mobile payment.

14. The non-transitory computer readable medium of claim 12,
wherein the account is at least one selected from a group consisting of a credit card account and a debit card account, and
wherein completing the transaction comprises debiting, at the financial institution, at least one selected from a group consisting of the credit card account and the debit card account.

15. The non-transitory computer readable medium of claim 12,
wherein the account is associated with an electronic wallet stored in the mobile device,
wherein completing the transaction comprises debiting the electronic wallet, and
wherein the electronic wallet is refilled from the financial institution.

* * * * *